(12) United States Patent  (10) Patent No.: US 9,286,214 B2
Stifter, Jr.  (45) Date of Patent: Mar. 15, 2016

(54) CONTENT DISTRIBUTION AND SWITCHING AMONGST DATA STREAMS

(75) Inventor: Francis J. Stifter, Jr., Hampton Falls, NH (US)

(73) Assignee: ARRIS Enterprises, Inc., Suwanee, GA (US)

(*) Notice: Subject to any disclaimer, the term of this patent is extended or adjusted under 35 U.S.C. 154(b) by 817 days.

(21) Appl. No.: 11/605,514

(22) Filed: Nov. 28, 2006

(65) Prior Publication Data

US 2008/0059724 A1  Mar. 6, 2008

Related U.S. Application Data

(63) Continuation-in-part of application No. 10/730,365, filed on Dec. 8, 2003, and a continuation-in-part of application No. 10/730,748, filed on Dec. 8, 2003, now Pat. No. 7,240,143.

(60) Provisional application No. 60/476,673, filed on Jun. 6, 2003, provisional application No. 60/476,705, filed on Jun. 6, 2003.

(51) Int. Cl.
*H04N 7/10* (2006.01)
*G06F 12/02* (2006.01)
(Continued)

(52) U.S. Cl.
CPC ...... *G06F 12/0284* (2013.01); *H04N 21/23424* (2013.01); *H04N 21/242* (2013.01); *H04N 21/44016* (2013.01)

(58) Field of Classification Search
CPC ................................................ H04N 21/23424
USPC ........................................... 709/203; 725/32
See application file for complete search history.

(56) References Cited

U.S. PATENT DOCUMENTS 5,021,893 A  6/1991 Scheffler
5,041,921 A  8/1991 Scheffler
(Continued)

FOREIGN PATENT DOCUMENTS

EP  0989756 A2  3/2000
JP  H10200854 A  7/1998
(Continued)

OTHER PUBLICATIONS

Wikipedia, the free encyclopedia, "MPEG-2", Jun. 1, 2006, pp. 1-9, http://en.wikipedia.org/eiki/MPEG-2, Wikipedia Foundation, Inc.
(Continued)

*Primary Examiner* — Glenford Madamba

(57) ABSTRACT

In lieu of merely forwarding different selected content including originally received decoder information (e.g., timing information) to a respective user for a newly selected data stream, a server modifies decoder information of a newly transmitted data stream in accordance with a previously transmitted stream (or a master clock associated with the user) such that respective decoder state information used to decode a first stream of content can also be used to decode a second stream of content. That is, the server encodes and transmits newly selected content to a requestor in accordance with current decoder state information already used by the requestor to decode previously received content. This enables splicing of content together from two or more asynchronous data streams into a single, contiguous data stream even though the data streams originate with different sets of timing information.

30 Claims, 9 Drawing Sheets

(51) Int. Cl.
*H04N 21/234* (2011.01)
*H04N 21/242* (2011.01)
*H04N 21/44* (2011.01)

(56) References Cited

U.S. PATENT DOCUMENTS

| | | | |
|---|---|---|---|
| 5,233,477 | A | 8/1993 | Scheffler |
| 5,365,381 | A | 11/1994 | Scheffler |
| 5,418,654 | A | 5/1995 | Scheffler |
| 5,502,601 | A | 3/1996 | Scheffler |
| 5,859,660 | A | 1/1999 | Perkins et al. |
| 5,900,830 | A | 5/1999 | Scheffler |
| 5,956,088 | A * | 9/1999 | Shen et al. ............... 375/240.25 |
| 6,064,794 | A | 5/2000 | McLaren et al. |
| 6,169,843 | B1 | 1/2001 | Lenihan et al. |
| 6,233,238 | B1 | 5/2001 | Romanowski et al. ....... 370/289 |
| 6,233,389 | B1 | 5/2001 | Barton et al. |
| 6,263,154 | B1 | 7/2001 | Scheffler |
| 6,343,346 | B1 | 1/2002 | Olnowich |
| 6,766,360 | B1 | 7/2004 | Conway et al. |
| 6,771,703 | B1 | 8/2004 | Oguz et al. |
| 6,993,081 | B1 | 1/2006 | Brunheroto et al. |
| 7,023,924 | B1 | 4/2006 | Keller et al. |
| 7,096,481 | B1 * | 8/2006 | Forecast et al. ................. 725/32 |
| 7,240,143 | B1 | 7/2007 | Scheffler et al. |
| 7,382,805 | B1 * | 6/2008 | Raza et al. .................... 370/528 |
| 2002/0128823 | A1 | 9/2002 | Kovacevic |
| 2002/0170067 | A1 | 11/2002 | Norstrom et al. |
| 2003/0043924 | A1 | 3/2003 | Haddad et al. |
| 2003/0185238 | A1 | 10/2003 | Strasser et al. |
| 2004/0117858 | A1 * | 6/2004 | Boudreau et al. ............. 725/144 |
| 2005/0010960 | A1 | 1/2005 | Kitazawa et al. |
| 2005/0180735 | A1 | 8/2005 | Oshima et al. |
| 2006/0093045 | A1 * | 5/2006 | Anderson et al. ........ 375/240.28 |
| 2006/0093315 | A1 | 5/2006 | Kelly et al. |
| 2009/0164652 | A1 | 6/2009 | Slobotskoy et al. |

FOREIGN PATENT DOCUMENTS

| | | | |
|---|---|---|---|
| JP | 11112452 | A | 4/1999 |
| JP | 2006121601 | A | 5/2006 |
| JP | 2006-121601 | | 11/2006 |
| WO | 9914955 | A1 | 3/1999 |

OTHER PUBLICATIONS

BCS04483 USA Non-Final Office Action Sep. 19, 2008.
BCS04483 USA Final Office Action May 11, 2009.
NSE4256 Network Search Engine, NETLOGIC, Revision 2.0, pp. 1-44, 2002.
Final Office Action mailed Jan. 19, 2012 in U.S. Appl. No. 10/730,365, Gray Hughes, filed Dec. 8, 2003.
Notice of Allowance mailed Jul. 31, 2012 in Canadian Patent Application No. CA 2670688.
Office Action mailed Apr. 12, 2011 in Canadian Patent Application No. CA 2670688.
Non Final Office Action mailed Jul. 5, 2006 in U.S. Appl. No. 10/730,748, Robert G. Scheffler, filed Dec. 8, 2003.
Non Final Office Action mailed Oct. 26, 2006 in U.S. Appl. No. 10/730,748, Robert G. Scheffler, filed Dec. 8, 2003.
Notice of Allowance mailed Feb. 26, 2007 in U.S. Appl. No. 10/730,748, Robert G. Scheffler, filed Dec. 8, 2003.
International Search Report for International Application No. PCT/US2008/087070 mailed on Feb. 4, 2009.
Wikipedia, The Free Encyclopedia, "MPEG-2", Jun. 1, 2006, pp. 1-9, <http://en.wikipedia.org/wiki/MPEG-2>, Wikipedia Foundation, Inc.
Office Action, U.S. Appl. No. 10/730,365, Apr. 27, 2011.
Office Action, U.S. Appl. No. 10/730,365, Oct. 7, 2010.
Office Action, U.S. Appl. No. 10/730,365, Dec. 30, 2009.
Office Action, U.S. Appl. No. 10/730,365, May 11, 2009.
Office Action, Canadian App. No. 2,670,688, Apr. 12, 2011.
PCT Search Report & Written Opinion, RE: Application #PCT/US07/85757; Nov. 28, 2007.
Office Action, Japanese App. No. 2009-539457 (Foreign Text and English Translation), Oct. 4, 2011.
Birch, C. H., "MPEG Splicing and Bandwidth Management", Broadcasting Convention, Doc No. XP006508813, Sep. 1997.
Anonymous, "Multiple Stream Decode Information Caching at Digital Video Decode Points for Fast Source Switching", Mason Publications, Research disclosure, Mar. 2003.
Ward C., et al., "Seamless Splicing for MPEG-2 Transport Stream Video Servers", SMPTE Motion Imaging Journal, Society of Motion Picture and Television Engineers, Dec. 1999.
Supplementary European Search Report for EP07854808, mailed on Jan. 24, 2014.

* cited by examiner

CONTENT DISTRIBUTION AND SWITCHING AMONGST DATA STREAMS

RELATED APPLICATIONS

This application is a continuation-in-part of U.S. patent application Ser. No. 10/730,365 entitled "METHODS AND APPARATUS FOR PROCESSING TIME-BASED CONTENT," having a filing date of Dec. 8, 2003, which itself claims the benefit of U.S. Provisional Application No. 60/476,673 entitled "METHODS AND APPARATUS FOR TIME BASED MATERIAL STREAM MANIPULATION," filed on Jun. 6, 2003 and U.S. Provisional Application No. 60/476,705 entitled "METHODS AND APPARATUS FOR IMPLEMENTING A STORAGE MEMORY SYSTEM WITH MULTIPLE ACCESS PORTS AND MEMORY ADDRESS VIRTUALIZATION," also filed on Jun. 6, 2003, the entire teachings of which are incorporated herein by this reference.

This application also is a continuation-in-part of U.S. patent application Ser. No. 10/730,748 entitled "METHODS AND APPARATUS FOR STORAGE OF DATA," having a respective filing date of Dec. 8, 2003 entitled "METHODS AND APPARATUS FOR PROCESSING TIME-BASED CONTENT," having a filing date of Dec. 8, 2003 now U.S. Pat. No. 7,240,143, which itself claims the benefit of U.S. Provisional Application No. 60/476,673 entitled "METHODS AND APPARATUS FOR TIME BASED MATERIAL STREAM MANIPULATION," filed on Jun. 6, 2003 and U.S. Provisional Application No. 60/476,705 entitled "METHODS AND APPARATUS FOR IMPLEMENTING A STORAGE MEMORY SYSTEM WITH MULTIPLE ACCESS PORTS AND MEMORY ADDRESS VIRTUALIZATION," also filed on Jun. 6, 2003, the entire teachings of which are incorporated herein by this reference.

BACKGROUND

Conventional technology has made it possible to more quickly and efficiently convey information to corresponding subscribers. For example, in the cable network space, digital cable now offers a multitude of channels to subscribers for receiving different types of streamed data content for playback on a respective television.

According to conventional cable technology, respective subscribers sometimes have so-called set top box devices in their homes that receive encoded digital information transmitted from a corresponding cable company. In many instances, a respective set top box receives a number of standard data streams on each of multiple different channels and decodes a single encoded data stream for playback on a display screen.

For example, upon receipt of encoded data, the set top box decodes the received data stream. Once decoded, a respective set top box in a viewer's home drives a corresponding television system with an appropriate "rasterized" signal of decoded data derived from the selected channel. Accordingly, a television viewer is able to view a corresponding television program of moving pictures transmitted by the cable company.

According to a conventional technique associated with IP (Internet Protocol) television (i.e., IPTV), transport of content to a home environment is limited by physical realities of twisted pair wires or passive optical networks. Accordingly, relatively few on-demand channels typically can be sent to a corresponding subscriber set top box in the home in addition to sending a standard package of multiple signals. Because there is a limit with respect to the "custom" channels, a server must make intelligent decisions, based on the user/set top box controls as to which select few/one channel to send down to the set top box for viewing by the subscriber.

SUMMARY

One deficiency associated with conventional transmission of content in accordance with conventional IPTV (Internet Protocol TeleVision) is the inconvenience experienced by a respective user when switching from one IP television channel to another. For example, an MPEG data server as discussed above can receive multiple asynchronous MPEG encoded data streams according to one or more internet protocols. Each encoded data stream received by the server already has unique timing information generated from separate, asynchronous master clocks at respective sources originating the data streams. Consequently, the server need only receive the information from respective originating sources and forward the data streams to clients in accordance with the user's requests. Decoders in the client set top boxes process received content streams to display respective audio and video information on a display screen.

As an example of a user inconvenience, assume that a user initially requests to view particular content. In such an instance, the decoder in a respective set top box initiates a respective self-synchronization algorithm with a newly received data stream to produce state information and synchronize itself based on timing information in the received data stream. Timing information in the received data stream enables the decoder in the set top box to properly process and identify how and when to play back different images and audible signals to a user. After synchronizing itself to a first content stream (e.g., an MPEG stream), when a respective user (e.g., at a client device such as a set top box) requests a server to serve a different data stream to the set top box, conventional techniques require that a decoder in the user's set top box abandon decoder state information used to decode the previous data stream and re-synchronize itself to the newly selected data stream (having corresponding unique timing information for decoding purposes) prior to being able to play back respective audio and video information associated with the newly selected data stream. Accordingly, upon switchover (e.g., during execution of the self re-synchronization process), there will be a duration of time in which a respective user's television will not properly display either the previously viewed data stream or the newly received data stream. In other words, according to conventional methods, the user's screen may be blank or blurred for a short duration of time when the set top box attempts to re-synchronize itself (e.g., build new decoding state information) with respect to the new data stream on channel switchover.

The following disclosure includes several useful embodiments to reduce, mitigate, or eliminate the impact an unclean switchover (e.g., a blackout or blurry picture) experienced as a result of a respective decoder having to re-synchronize itself (e.g., generate a new set of decoder state information) upon receipt of each newly received data stream. For example, according to a general embodiment herein, in lieu of merely forwarding different selected content including originally received decoder information (e.g., timing information) to a respective user, a server modifies decoder information of a newly transmitted data stream in accordance with a previously transmitted stream (or possibly a master clock associated with the user) such that respective decoder state information used to decode a first stream of content can also be used to decode a second stream of content, even though the second stream of data was originally encoded with timing information independent of the first received data stream.

According to such embodiments, the server transmits newly selected content to a requestor in accordance with current decoder state information used by the requestor to decode the first data stream (e.g., the initially viewed content). That is, the server modifies the original timing information in the second data stream in accordance with the first data stream based on a difference associated with respective master clocks used to originate the first and stream controller data stream. One embodiment herein involves splicing content together from two or more asynchronous data streams into a single, contiguous data stream that can be decoded using the same decoder state information at the subscriber. This technique reduces or eliminates the unclean switchover (e.g., a blackout or blurry picture) that can occur for a duration of time upon switchover from one independent data stream channel to another independent data stream channel.

More particularly, in one embodiment, a respective server such as a process that aggregates and distributes data streams maintains a repository of buffers that (temporarily) stores a respective window of most recently received content (e.g., separate data streams) for each of the multiple different asynchronous content streams or broadcast channels. Each of the different asynchronous content streams is encoded according to its own respective independent master clock. The respective window of content stored in the repository is wide enough to store at least two corresponding access points (an access point is a picture boundary in the encoded stream that is clean for breaking in and out of the content, and example if this would be an I-Picture in Mpeg2 encoded content) of information from each of the multiple content streams.

During transmission, the respective server initially generates an outputted data stream to include content from a first content stream of the multiple different content streams received by the server. As discussed above, the content included in the first content stream has associated decoding information (e.g., timing information) enabling a corresponding remote recipient (e.g., a set top box) over a network to decode the data stream and play back the content from the first content stream on a respective media player such as a display screen.

The server can be configured to receive "change channel" commands in response to a respective user at the corresponding remote recipient initiating a channel change to view or playback different content. In response to receiving a change channel command from a user, the server transmits content from a second content stream (of the multiple asynchronous content streams received by the server) in the outputted data stream in lieu of transmitting the content from the first content stream in the outputted data stream.

To facilitate a transition of transmitting (and/or receiving) the content from the second content stream in lieu of transmitting the first content stream in the outputted data stream, the server modifies the decoding information associated with the second content stream in accordance with the information associated with the first content stream to enable the corresponding remote recipient to seamlessly decode the content from the second content stream using decoder state information previously used by the corresponding remote recipient to decode the first content stream. In other words, according to one embodiment, the server modifies timing information associated with one or more of the data streams received by the server in order to splice the first content and the second content into a single outputted data stream. In one embodiment, the server modifies the timing information associated with the second data stream by an amount equal to a difference between respective master clocks generating the first and second data streams. The modified timing information included in the outputted data stream (such as a Moving Pictures Expert Group or MPFG encoded data stream) enables a corresponding recipient to lock onto and decode contents in the outputted data stream generated by the server, even though the outputted data stream includes content from two or more content streams which have been originated based on different master clocks.

Techniques herein are well suited for use in applications such as those that enable selection amongst multiple asynchronous data streams for playback purposes. However, it should be noted that configurations herein are not limited to use in such applications and thus configurations herein and deviations thereof are well suited for other applications as well.

In addition to potentially being implemented via discrete hardware components such as logic, buffers, registers, etc., other embodiments herein can include a hardware platform such as a computerized device (e.g., a computer processor system, a host computer, personal computer, workstation, etc.) that is configured to support the aforementioned techniques of modifying timing information in respective content streams. In such embodiments, the computerized device includes a memory system, a processor (e.g., a processing device), and a respective interconnect. The interconnect couples the processor to the memory system. The memory system is encoded with an application (e.g., software code) that, when executed on the processor, produces a process for splicing of contents associated with multiple data streams as discussed above.

Yet other embodiments of the present disclosure include software programs to perform the method embodiment and operations summarized above and disclosed in detail below. More particularly, embodiments herein include a computer program product (e.g., a computer-readable medium) including computer program logic encoded thereon that may be executed on a computerized device to splice content into an outputted data stream as explained herein. The computer program logic, when executed on at least one processor with a computing system, causes the processor to perform the operations (e.g., the methods) indicated herein as embodiments of the present disclosure. Such arrangements as further disclosed herein are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or a Field Programmable Gate Array (FPGA) or as downloadable software images in one or more modules, shared libraries, etc. The software or firmware or other such configurations can be installed onto a computerized device to cause one or more processors in the computerized device to perform the techniques explained herein.

One more particular embodiment of the present disclosure is directed to a computer program product that includes a computer readable medium having instructions stored thereon for supporting creation, management, and/or modification of data streams according to embodiments herein. The instructions, when carried out by a processor of a respective computer device, cause the processor (e.g., a server) to perform the steps of: i) transmitting content from a first content stream in an outputted data stream; ii) in response to receiving a command, transmitting content from a second content stream in the outputted data stream in lieu of transmitting the content from the first content stream in the outputted data stream; iii) modifying decoding information associated with the content from the second content stream in accordance with decoding information associated with the content from the first content stream; and iv) transmitting the modified decoding information in the outputted data stream to enable a recipient of the outputted data stream to seamlessly play back the outputted data stream based on same decoder state information that is used to decode both the content from the first content stream and the content from the second content stream in the outputted data stream. Other embodiments of the present application include software programs to perform any of the method embodiment steps and operations summarized above and disclosed in detail below.

As discussed above, one embodiment herein includes a data/content server for performing switchover functions with respect to streaming data. However, as will be discussed later in this specification, the functionality discussed herein can be employed from any type of data communication device (e.g., routers, switches, Digital Subscriber Line Access Multiplexers, Cable Modem Termination System, Passive Optical Networks, etc.) to facilitate a so-called FastChannelChange function.

BRIEF DESCRIPTION OF THE DRAWINGS

The foregoing and other objects, features and advantages of the present application will be apparent from the following more particular description of preferred embodiments, as illustrated in the accompanying drawings in which like reference characters refer to the same parts throughout the different views. The drawings are not necessarily to scale, with emphasis instead being placed upon illustrating example embodiments, principles and concepts.

DETAILED DESCRIPTION

In lieu of merely forwarding different selected content including originally received decoder information (e.g., timing information) to a respective user for a newly selected data stream, a server modifies decoder information of a newly transmitted data stream in accordance with a previously transmitted stream (or a master clock associated with the user) such that respective decoder state information used to decode a first stream of content can also be used to decode a second stream of content, even though the second stream of content was originated based on its own independent master clock. For example, a server according to embodiments herein encodes and transmits newly selected content to a requestor in accordance with current decoder state information previously used by the requestor (e.g., a decoder device) to decode previously received content. Modification of timing information enables the server to splice content together from two or more asynchronous data streams into a single, contiguous data stream even though the data streams originate with different sets of timing information. In such an embodiment, a respective decoder in a set top box need not synchronize itself based on different or incompatible timing information originally associated with the second data stream. Instead, the decoder in the set top box utilizes the old decoding state information used to process the first data stream to process the second data stream, which includes modified timing information. Accordingly, the decoder in the set top box need not abandon the old decoder state information upon receipt of the data from the second content stream.

Figure 1:
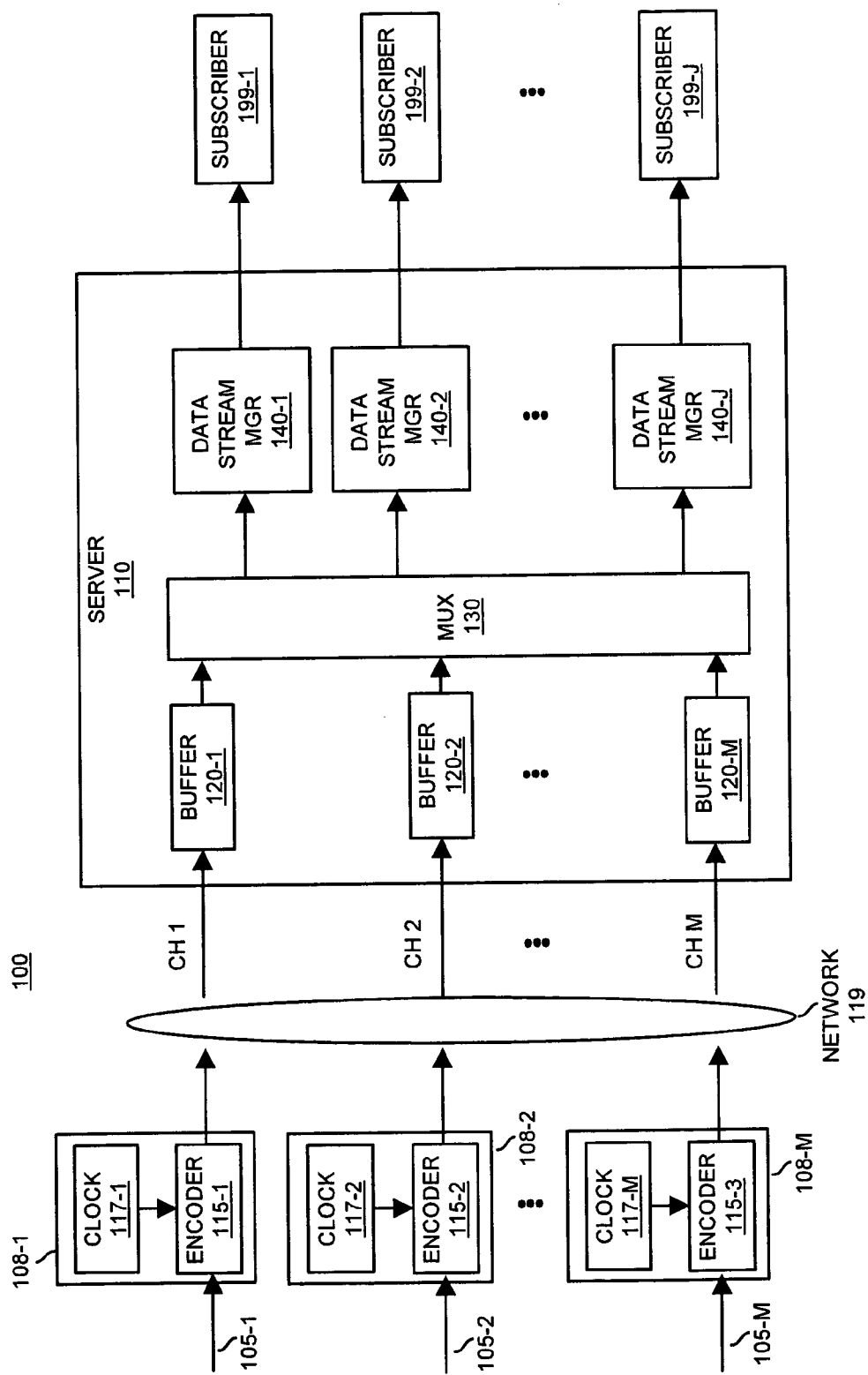
FIG. 1 is a block diagram of a data distribution environment according to embodiments herein.

FIG. 1 is a diagram of a data distribution environment 100 according to embodiments herein. As shown, data distribution environment 100 includes stream sources 108 (e.g., stream source 108-1, stream source 108-2, . . . , stream source 108-M), network 119, server 110, and subscribers 199 (e.g., subscriber 199-1, subscriber 199-2, . . . , subscriber 199-J). Each stream source 108 includes a respective clock 117 and encoder 115. For example, stream source 108-1 includes clock 117-1 and encoder 115-1 to create a data stream on channel 1; stream source 108-2 includes clock 117-2 and encoder 115-2 to create a data stream on channel 2, and so on. Server 110 includes buffers 120 (e.g., buffer 120-1, buffer 120-2, . . . , buffer 120-M), multiplexer 130, and data stream managers 140 (e.g., data stream manager 140-1, data stream manager 140-2, . . . , data stream manager 140-J).

During operation, each of stream sources 108 receives and encodes respective content 105 (e.g., content 105-1, 105-2, . . . 105-M) for transmission as streaming content (e.g., audio and/or video data such as an MPEG encoded content stream) over network 119 (e.g., a packet-switched network, private communication links, etc.) to server 110. Note that server 110 can be any type of data communication device that streams data over a network connection. For example, the functionality such as switchover capability can be employed from any type of data communication device (e.g., routers, switches, Digital Subscriber Line Access Multiplexers, Cable Modem Termination System, Passive Optical Networks, etc.) to facilitate Fast Channel Changing.

In one embodiment, the streams of data generated by stream sources 108 are transmitted according to IGMP (Internet Group Management Protocol) although any protocol or source type can transmit the different streams to server 110.

Each stream source 108 has its own independent clock 117 used by a respective encoder 115 to create encoded streams of data for transmission over network 119 to server 110. For example, clock 108-1 operates independently of (i.e., is asynchronous with respect to) clocks 108-2 . . . 108-M; clock 108-2 operates independently of (i.e., is asynchronous with respect to) clock 108-1 and clock 108-M, and so on. Encoder 115-1 of stream source 108-1 uses clock 117-1 to produce a respective content stream on channel 1. Other stream sources 108 operate in a similar way.

Server 110 includes a number of buffers 120 configured to receive and at least temporarily store encoded content streams produced by stream sources 108. In one embodiment, each buffer stores a couple to several seconds of data (e.g., in terms of playback time) from stream sources 108. The amount of buffering can vary depending on the application. As an alternative to buffers, the server can maintain a repository (e.g., memory, storage disk, etc.) that stores an entire program (e.g., movie) than only storing a most recent portion of streaming data.

Note that server 110 can include additional storage for storing advertisements targeted to the different respective subscribers. At appropriate intervals during streaming of data to respective subscribers, the server 110 inserts corresponding targeted advertisements. In one embodiment, the server 110 inserts the targeted advertisements and adjusts timing information in a corresponding content stream so that the content stream appears to the subscriber as a contiguous content stream including the advertisements without the decoder at the subscriber having to synchronize itself to new timing information associated with the advertisement.

Multiplexer 130 provides data stream managers 140 access to temporarily stored data and enables distribution of any data stream information temporarily stored in buffers 120 (or permanently stored in a respective repository) to any subscriber 199. That is, there is no limitation as to how many data stream managers 140 can send the same data stream to respective subscribers 199.

Figure 2:
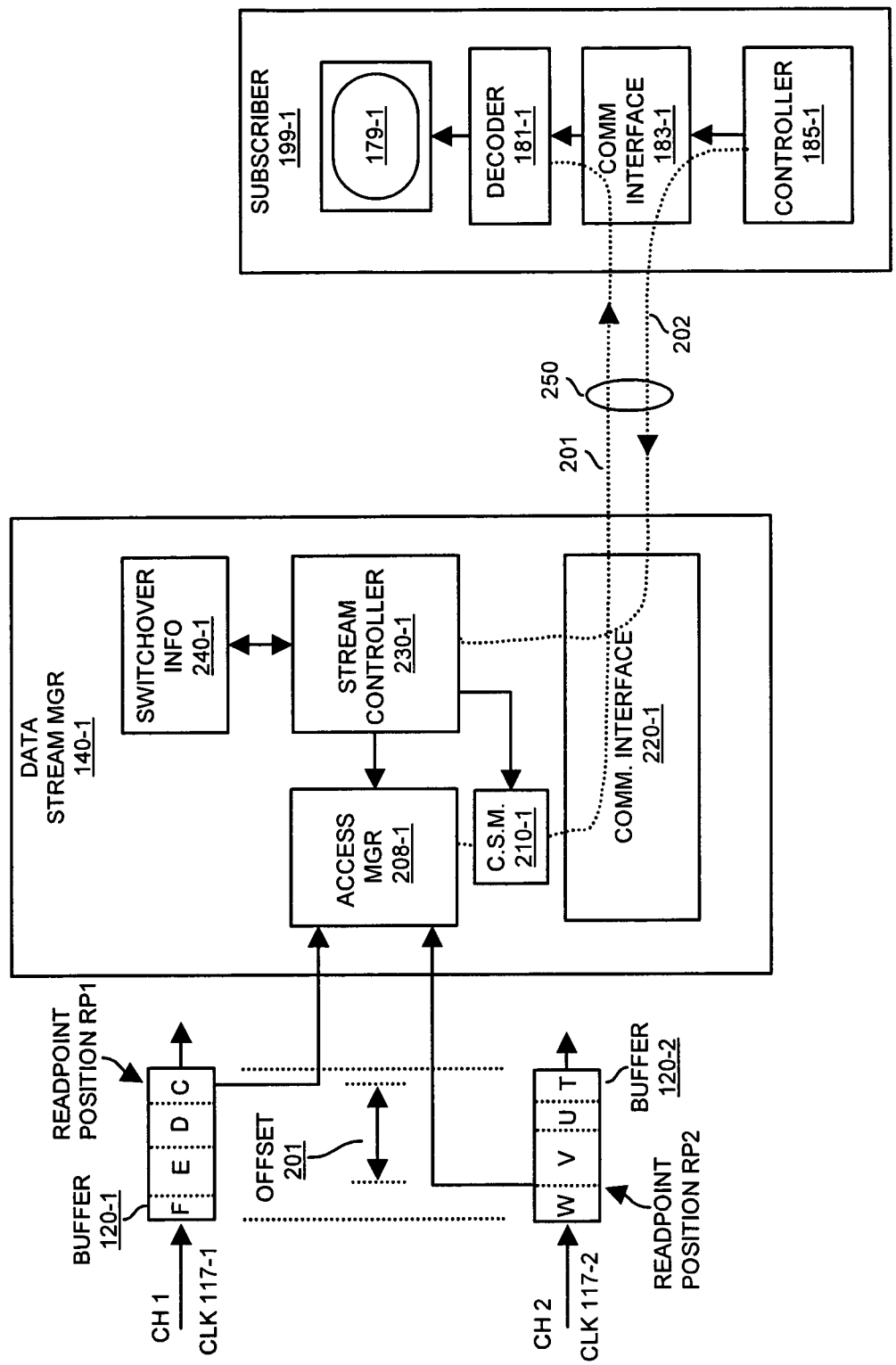
FIG. 2 is a block diagram illustrating a data stream manager that modifies timing information in a newly transmitted data stream according to embodiments herein.

In one embodiment, the data stream managers 140 of server 110 interface with multiplexer 130 and control which of multiple content streams stored in buffers 120 to forward to a respective subscriber 199 based on feedback from a user. For example, assume that a subscriber such as subscriber 199-1 notifies data stream manager 140-1 which of multiple content streams on channels 1 through M to forward to subscriber 199-1 for playback. The data stream manager 140 receiving such a playback request forwards the newly requested data stream in lieu of the old one. However, as will be discussed more specifically in the following figures, in lieu of merely forwarding different selected content such as initially forwarding the content stream on channel 1 and then switching to sending a new (unmodified) content stream such as content stream from channel 2 to a respective subscriber 199-1, the data stream manager 140-1 initiating the changeover access switchover information 240-1 (FIG. 3) to select appropriate readpoint information (e.g., a respective point in which to read data) for the new buffer from which to stream data and a timing correction factor (e.g., a difference between master clocks generating the data streams) to modify decoding information associated with a newly transmitted data stream. That is, as previously discussed, when transmitting new data such as content from channel 2, the data stream manager 140-1 modifies timing information in the newly transmitted content stream so that the subscriber 199-1 need not re-synchronize itself with new timing information in the newly received data stream. For example, the data stream manager 140-1 modifies decoding information (e.g., timing information) in the newly transmitted content stream (e.g. channel 2 in this example) such that the subscriber 199-1 can decode the newly received content stream based on decoding state information used to decode the previous content stream (channel 1). FIG. 2 is a detailed block diagram illustrating a technique of switching from transmission of one content stream to another according to embodiments herein. As shown, data stream manager 140-1 includes access manager 208-1, content stream modifier 210-1, communication interface 220-1, stream controller 230-1, and switchover information 240-1. Subscriber 199-1 includes remote control 185-1, communication interface 183-1, decoder 181-1, and playback equipment 179-1 (e.g., one or more media players).

In the context of the present example, assume that the data stream manager 140-1 deploys access manager 208-1 to initially read from buffer 120-1 at readpoint, RP1 and stream data from channel 1. Recall that buffer 120-1 can be a FIFO (First In First Out) device or repository for storing a segment (e.g. a two second window) of the streaming data associated with channel 1 received over network 119. Each of buffers 120 can be a portion of memory in which newest received data (e.g., new frames of information) is written over oldest received data (e.g., old frames of data).

Data stream manager 140-1 deploys access manager 208-1 in order to forward (all or a portion of) content C (during which a switchover request occurs) and previous content associated with channel 1 in buffer 120-1 such as content B and A (not shown) through communication interface 220-1 to subscriber 199-1. This initial data served by data stream manager 140-1 travels along path 201 so that subscriber 199-1 receives the information at communication interface 183-1. After the content stream is received, the subscriber 199-1 deploys decoder 181-1 to decode the content stream (e.g., MPEG encoded data stream) for playback on equipment 179 such as a display screen, audio speaker, etc. In the context of the present example, while feeding subscriber 199-1 the data labeled content C from buffer 120-1, assume that the user (at subscriber 199-1) provides input to controller 185 (e.g., a wireless remote handheld control device, keyboard, mouse, phone, etc.) to send a request over path 202 to notify data stream manager 230-1 of a desire to playback or receive a new content stream such as content stream on channel 2 stored in buffer 120-2. In response to receiving the request, stream controller 230-1 accesses switchover information 240-1 (see FIG. 3) as mentioned above.

Note that many different subscribers can view a commonly selected data stream. Each viewer viewing the common channel may have different timing information and real-time depending on where the entry point for the new-channel is at the time the channel is changed.

As previously discussed, the data stream modifier 140-1 of server 110 can initiate modification of corresponding timing information in data streams such that a content stream received by a respective subscriber over a network appears to be one contiguous stream even when a switchover happens to occur. Note that other embodiments herein include moving the modification logic (e.g., functionality associated with data stream manager 140-1 and buffers 120) down to a respective set top box at the subscriber. In such an instance, the subscriber can receive and buffer multiple channels of information over link to 250. The subscriber maintains switchover information 140-1 for purposes of modifying the timing information in a selected new channel in accordance with a current state of the decoder 181. Thus, there can be little or no delay between a time of selecting viewing of a new channel and the time the channel is actually played back on a respective media player because the data stream appears to be the same channel to the decoder 181 even though there was a channel change.

Figure 3:
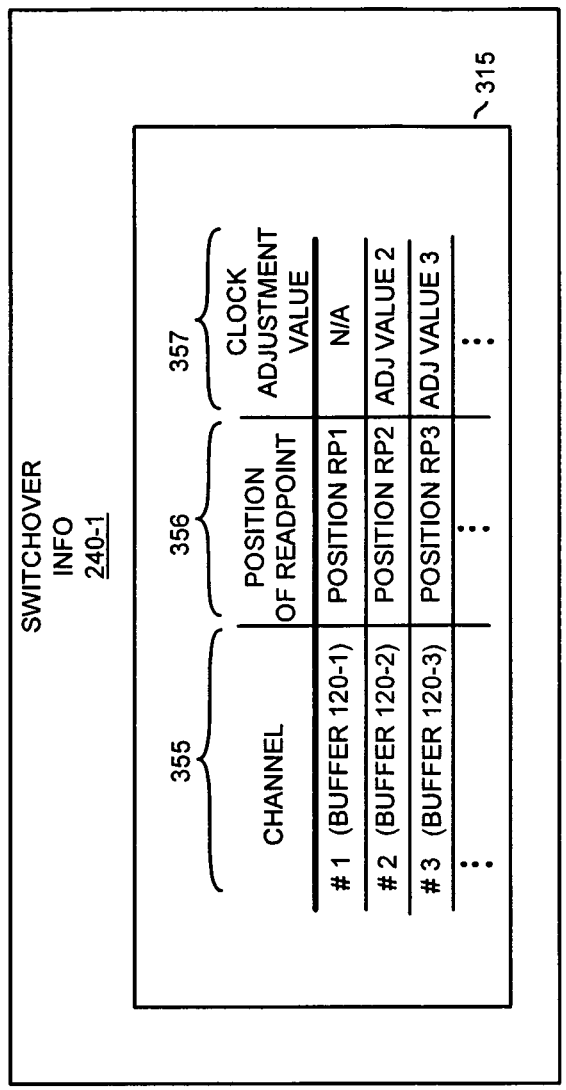
FIG. 3 is a diagram of example switchover information according to embodiments herein.

FIG. 3 illustrates details of switchover information 240-1 according to embodiments herein. Data stream manager 140-1 maintains the switchover information 240-1 to enable a corresponding subscriber 199-1 to selectively switchover to receiving other channels of streaming data. As previously discussed, server 110 (as discussed above in FIG. 1) includes multiple data stream managers 140. Note that each of data stream managers 140 maintains corresponding switchover information enabling a respective subscriber to receive a different stream of information for playback.

In the context of the present example in FIG. 3, switchover information 240-1 includes table 315. Table 315 includes column 355, column 356, and column 357. Column 355 identifies different channels of information that can be selected by respective subscriber 199-1 for playback on a respective media player.

Column 356 indicates a corresponding readpoint in a respective buffer 120 to be used by access manager 208-1 when switching to a newly selected content stream channel. In one embodiment, the readpoint values in table 315 point to specific frames of information in a potential newly selected stream. For example, in one embodiment, the readpoints in column 356 of switchover information 240-1 identify corresponding locations of frames of data (e.g., I-frames or anchor frames upon which following frames in the data stream depend) in a respective selectable channel. One purpose for pointing to and switching over to anchor frames (as specified by readpoints) on switchover to a newly selected channel is to ensure that the decoder associated with a respective subscriber 199 is able to immediately (or after a small delay) experience a clean transition of audio and visual effects associated with the newly selected channel on switchover. In other words, according to one embodiment herein, the decoder at subscriber 199-1 is able to immediately playback the anchor frame because the readpoint in table 315 specifies an I-frame as opposed to a P-frame or B-frame in the data stream. The I-frame is considered an anchor frame because a sequence of content typically begins with an I-picture (i.e., intra-coded picture or I-frame) as an anchor. The I-picture and following data in a segment before the next I picture in the stream are considered a Group of Pictures (GOP). Within a GOP, there are typically a number of forward predicted or P pictures. During decoding, a first P-picture is decoded using the I-picture as a basis. The P-pictures provide difference information defining changes in the anchor picture that produce a motion picture. Each segment also can include B-pictures, which may be decoded using vectors and difference data from I-pictures or P-pictures. Accordingly, after the I-picture, the first P-picture is sent next, and so on. Once the decoder receives an I-picture and P-picture, the B-pictures in between can be decoded by moving motion compensation data forwards or backwards.

Note that the position of newly received I-frames in respective buffers 120 will vary as newly received data overwrites older data. Thus, according to embodiments herein, as new data is stored in buffers 120, the contents of table 315 are also updated so that the readpoints specified in column 356 of table 315 are updated to point to new locations of I-frames as old data is overwritten with new data from a respective data stream.

Column 357 indicates a clock adjustment value (e.g., timing correction information) to be made to a respective content stream during a channel switchover. In one embodiment, server 110 deploys one or more processes to inspect timing information in each of the received data streams in order to learn a time difference between independent master clocks (e.g., clocks 117 in FIG. 1) generating the respective data streams.

Referring again to FIG. 2, upon selection of channel 2 for viewing by a user at subscriber 199-1, stream controller 230-1 identifies that, in order to switchover to channel 2, access manager 208-1 must read from readpoint position RP2 from buffer 120-2. Additionally, the stream controller 230-1 identifies that the timing information in channel 2 must be modified based on timing correction information such as adjustment value 2 (e.g., a difference between master clocks generating the data streams).

When switching from channel 1 (e.g., the currently viewed channel) to channel 2, the content stream modifier 210-1 modifies timing information in the new channel by an amount equal to the adjustment value. For example, if original timing information in the data stream of channel 2 is X, then the modified timing information for incorporating in the data stream of channel 2 is X+ADJ VALUE2 (where ADJVALUE2 could be a positive or negative value).

In one embodiment, after accessing switchover information 240-1, stream controller 230-1 notifies access manager 208-1 of the readpoint in which to read data from new buffer 120-2 upon switchover. Stream controller 230-1 also notifies content stream modifier 210-1 of the timing correction factor such as ADJ VALUE2 to apply to the newly transmitted data stream. Accordingly, upon switchover, access manager 208-1 accesses buffer 120-2 based on new readpoint RP2. Also, content stream modifier 210-1 modifies timing information in the newly transmitted content stream so that the decoder 181-1 at subscriber 199-1 is able to decode the new content stream from channel 2, even though the contents from channel 2 originates based on a different master clock. In other words, the content stream modifier 210-1 modifies the timing information in channel 2 to prevent decoder 181-1 from having to abandon current decoder state information and perform a complete resynchronization in order to receive and decode the data on the new channel.

Note that since buffers 120 in FIG. 2 are configured to temporarily store data as FIFOs in one embodiment (where data overflows at the right portion of the buffer), content F and W in respective buffers 120-1 and buffer 120-2 represent most recently received data information while content C and T in respective buffers 120-1 and buffer 120-2 represent most oldest received data information. Assuming that the switchover occurs while data stream manager 140-1 reads and streams data from content C of channel 1, the content stream modifier 210-1 transmits the content stream as shown in FIG. 4 to subscriber 199-1.

Figure 4:
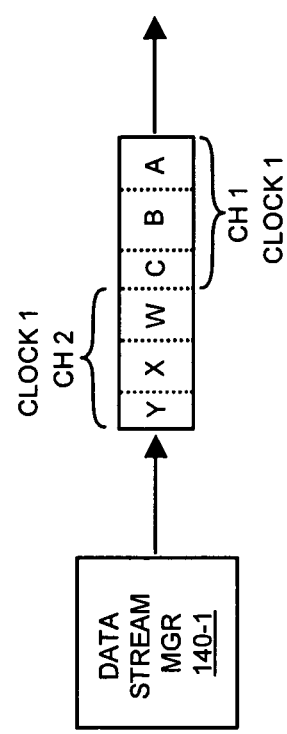
FIG. 4 is a diagram illustrating splicing of data from two separate data streams according to embodiments herein.

FIG. 4 is a diagram of streaming content during switchover according to embodiments herein. Because content stream modifier 210-1 modifies the decoder information in channel 2 to conform with that of channel 1, the switchover from one channel to another (e.g., from channel 1 to channel 2) is seamless. In other words, the subscriber 199-1 is able to continuously playback data (e.g., content A, B, C, W, X, Y, etc.) even though there was a change in channel during transmission of content C. For comparison purposes, recall that conventional methods as discussed above result in a blackout period during which the decoder of the subscriber 199-1 has to re-synchronize itself with the newly received data stream in order to play back the newly received data stream. According to embodiments herein, there is no blackout or unclean transition period because the data from channel 2 appears as though it was generated based on the same clock (e.g., clock 108-1) or timing information used to produce the data stream on channel 1. That is, content stream modifier 210-1 modifies original timing information (e.g., MPEG based timing information such as PCR, DTS, and PCR, etc.) by an amount specified by adjustment value 2 (i.e., ADJ VALUE2) and/or offset 201 so that channel 2 appears to be generated based on the same clock as channel 1. As previously discussed, the clock adjustment value, ADJ VALUE2, in column 357 can represent a time difference between clocks associated with CH1 and CH2.

Figure 5:
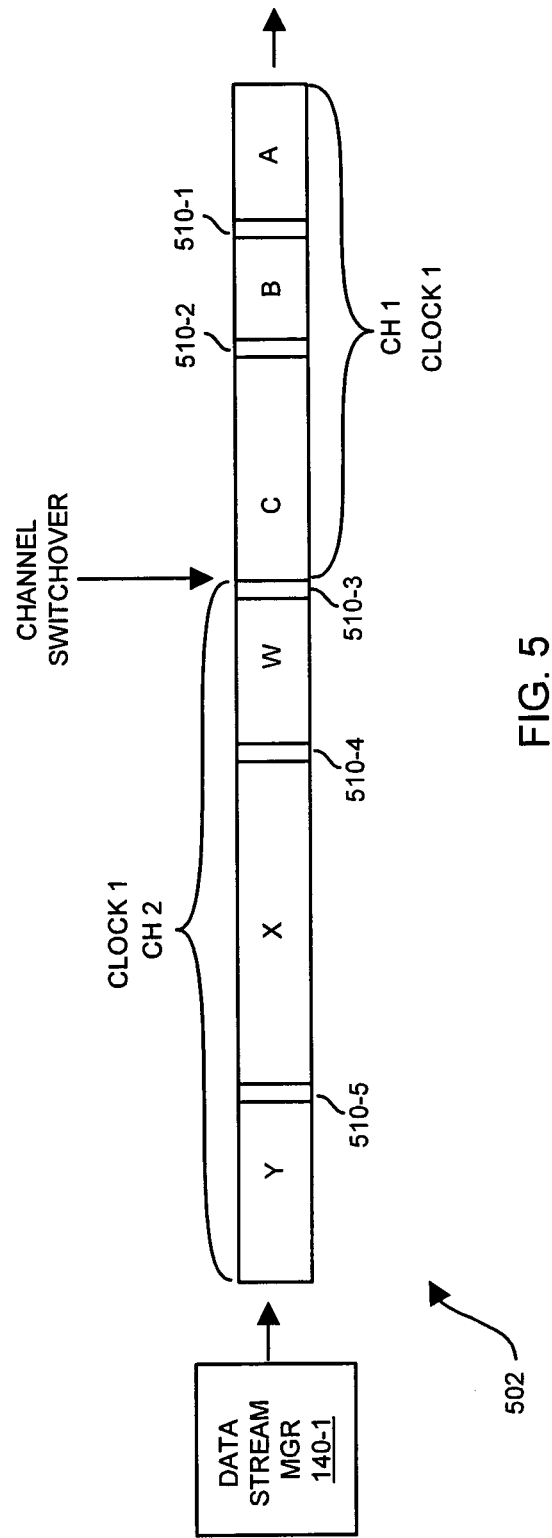
FIG. 5 is a diagram illustrating splicing of data streams that include independent frames according to embodiments herein.

FIG. 5 is a diagram illustrating a more detailed snapshot of data at a time during switchover according to embodiments herein. As shown, the outputted data stream 502 (e.g., an MPEG data stream) from data stream manager 140-1 includes segments of data such as segment A, segment B, segment C, segment W, segment X, and segment Y. In the context of the present example, the outputted data stream 502 includes I-frames 510 (e.g., anchor frames such as I-frame 510-1, I-frame 510-2, . . . ), which are independent or self-standing frames of information on which following portions of a respective segment (e.g., B-pictures and P-pictures) depend. The I-picture or I-frames 510 include a complete set of data defining a setting of every pixel on a display screen. The I-frames 510 can include the decoder timing information that is modified in accordance with adjustment values specified in table 315 as previously discussed.

Suppose switchover occurs some time during a middle of a transmission of segment C of information. Upon receiving a command to switchover from one channel to another, as previously discussed, the stream controller 230-1 (in FIG. 2) accesses the switchover information 240-1 to identify the location (via readpoint RP2) of a next anchor frame (e.g., I-frame) in the new channel in which to retrieve and transmit data. In one embodiment, upon switchover, the data stream manager 140-1 completes sending all data associated with segment C up until a next I-frame associated with segment D in channel 1. This can introduce a small delay of up to a second or so in which the user continues to view the old data stream on channel 1 even though the user has selected a new channel for viewing.

Note that in certain embodiments, there is no need to complete sending all of the remaining information in segment C (e.g., all information in segment C such as up to an I-frame in segment D) before switching over to a new channel. For example, channel switchover can occur at a convenient exit point (e.g., a certain type of frame) in the middle of segment C. In another embodiment, immediate switchover to channel 2 upon detection of the selection to switch channels prevents occurrence of an unnecessary delay in viewing requested information when a user remotely switches from one channel to another.

Note that in addition to modifying timing information in anchor frames (e.g., I-pictures 510), content stream manager 210-1 can modify timing information in B-picture and P-picture frames as well.

Figure 6:
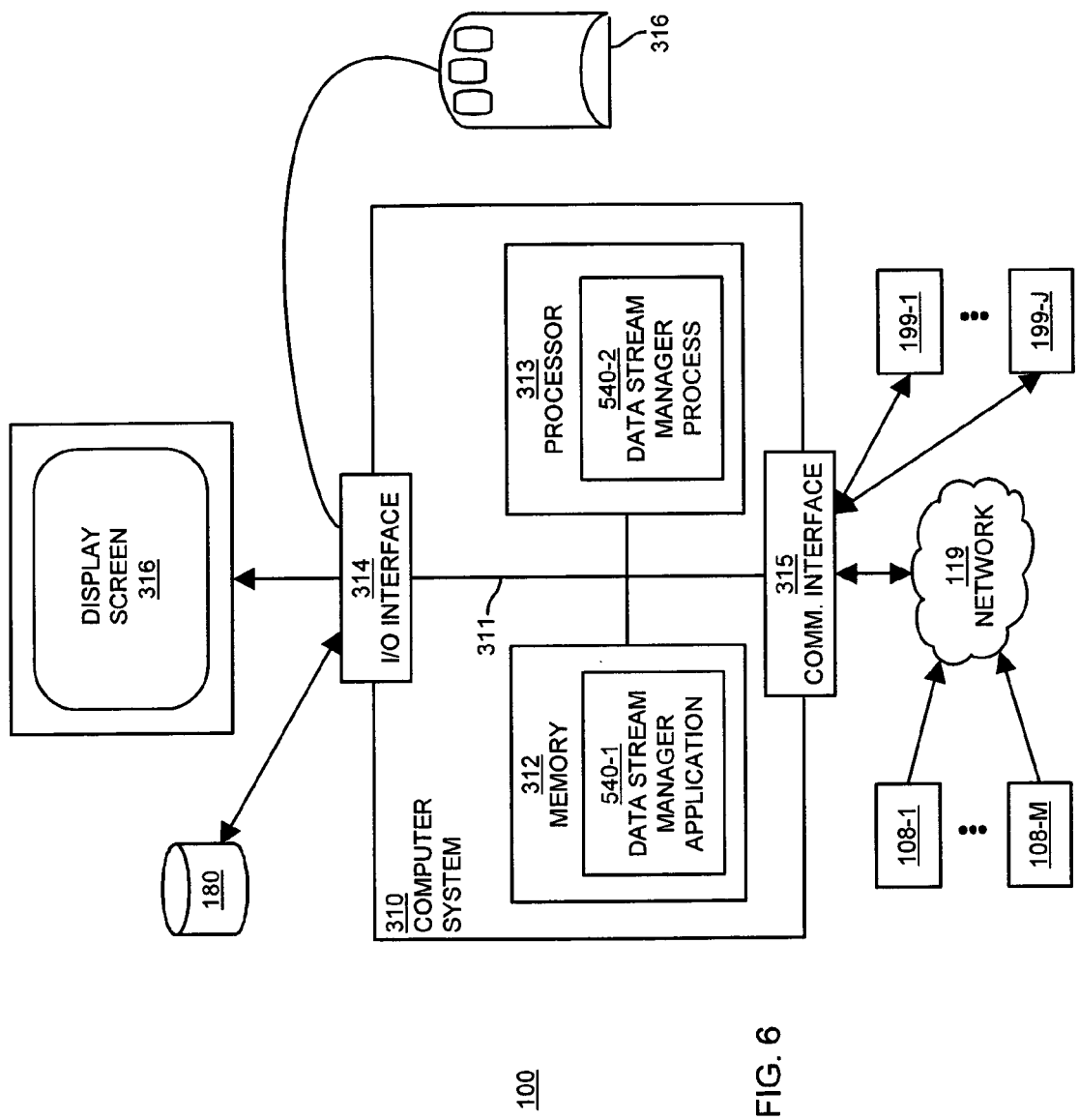
FIG. 6 is an example diagram of an architecture for implementing techniques according to embodiments herein.

As previously discussed, FIGS. 1-5 describe the functionality associated with server 110 and, more specifically, data stream managers 140 according to embodiments herein. FIG. 6 is a diagram illustrating a sample architecture for implementing one or more processing functions according to an embodiment herein.

As shown, the data stream managers 140 as previously discussed can be implemented in a respective computer system 310 (e.g., server 110) including a processor 313 and corresponding software code (e.g., data stream manager application 540-1) to carry out the embodiments discussed in this specification. As an alternative to the embodiment as shown in FIG. 6, the data stream managers 140 can be implemented via hardware components such as logic gates, buffers, etc. or a combination of both types of suitable hardware and software resources.

As shown in FIG. 6, computer system 310 (e.g., an example configuration of server 110) of the present example includes an interconnect 311 that couples a memory system 312, a processor 313, an input/output interface 314, and a communications interface 315. Input/output interface 314 enables computer system 310 to communicate with repository 180 and peripheral devices 316 such as handheld mice, display screens, printers, etc. A computer system 310 implementing data stream manages 140 (FIG. 1) can include all, some, or none of these peripheral devices. Communications interface 315 enables computer system 310 to receive, process, and distribute streaming data to different target subscribers 199 in data distribution environment 100.

As shown, memory system 312 is encoded with one or more data stream manager applications (e.g., data stream manager application 540-1) supporting the functionality of receiving, modifying, and distributing different data streams for end users. Data stream manager application 540-1 can be embodied as software code such as data and/or logic instructions (e.g., code stored in the memory or on another computer readable medium such as a disk) that support processing functionality according to different embodiments described herein. During operation, processor 313 accesses memory system 312 (and/or repository 180) via the interconnect 311 in order to launch, run, execute, interpret or otherwise perform the logic instructions of the data stream manager application 540-1. Execution of data stream manager application 540-1 produces processing functionality in data stream manager process 540-2. In other words, the data stream manager process 540-2 provides functionality associated with the data stream managers 140 as discussed above in FIG. 1.

It should be noted that the data stream manager applications executed in computer system 310 can be represented in FIG. 6 by either one or both of the data stream manager application 540-1 and/or the data stream manager process 540-2. For purposes of this discussion, general reference will be made to a specific data stream manager 140-1 as performing or supporting the various steps and functional operations to carry out techniques discussed herein.

It should also be noted that example configurations herein include the data stream manager application 540-1 itself (i.e., the un-executed or non-performing logic instructions and/or data). The data stream manager application 540-1 may be stored on a computer readable medium (such as a floppy disk), hard disk, or optical medium. The data stream manager application 540-1 may also be stored in a memory system 312 such as in firmware, read only memory (ROM), or, as in this example, as executable code in, for example, Random Access Memory (RAM). In addition to these embodiments, it should also be noted that other embodiments herein include the execution of data stream manager application 540-1 in processor 313 as data stream manager process 540-2. Thus, those skilled in the art will understand that the content stream 310 may include other processes and/or software and hardware components to carry out functionality described herein.

Figure 7:
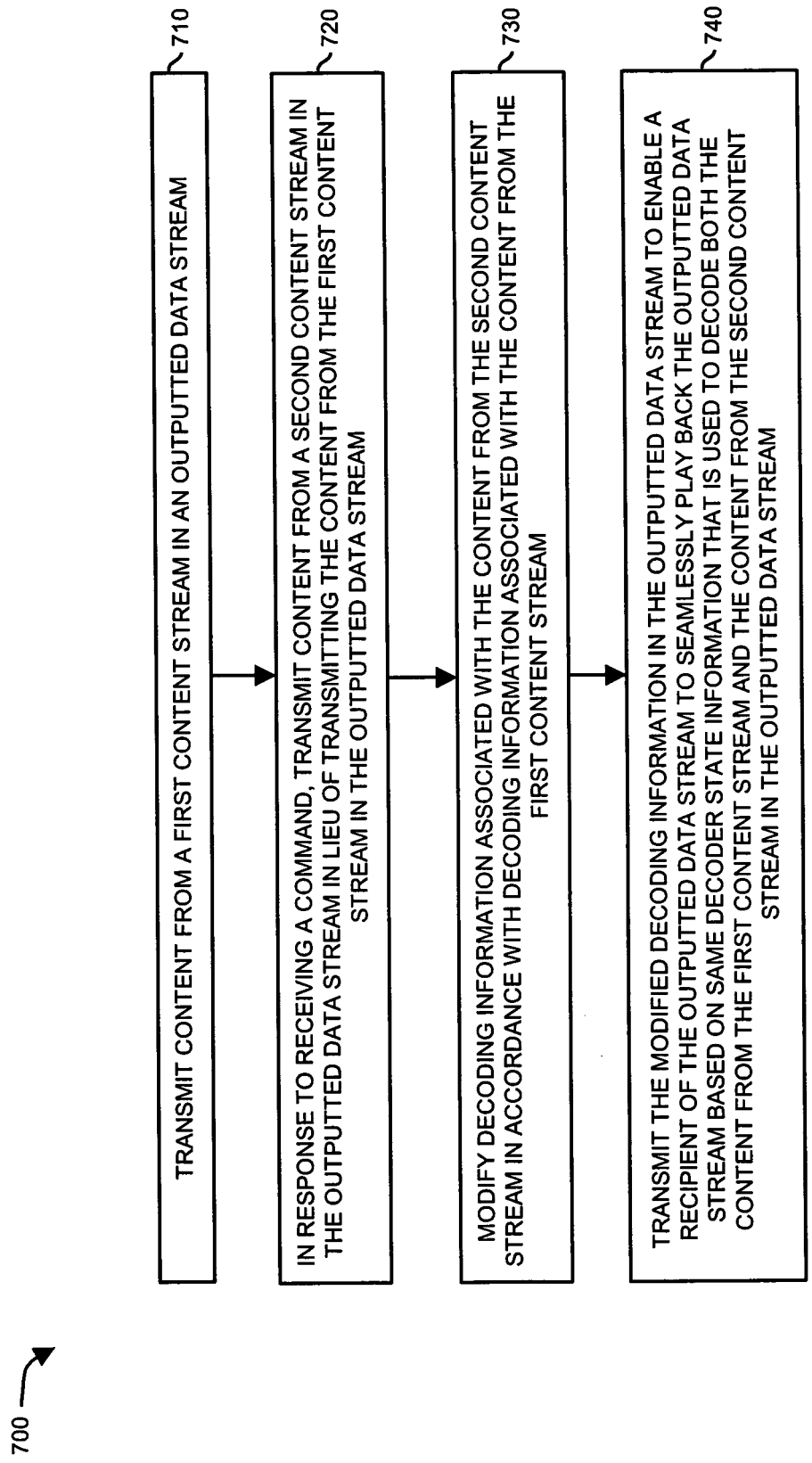
FIG. 7 is a flowchart illustrating a technique of splicing content together according to embodiments herein.

FIG. 7 is a flowchart 700 illustrating a technique of distributing data information according to embodiments herein. Note that FIG. 7 will be described with respect to the embodiments as discussed with respect to FIGS. 1-6. Also, as mentioned above, note again that data stream managers 140 and related functionality can be implemented in hardware and/or software.

In step 710, the data stream manager 140-1 in server 110 transmits content from a first content stream (e.g., data received on channel 1) in an outputted data stream to subscriber 199-1.

In step 720, in response to receiving a command, the data stream manager 140-1 initiates transmission of content from a second content stream (e.g., data received on channel 2) in the outputted data stream in lieu of transmitting the content from the first content stream in the outputted data stream to subscriber 199-1.

In step 730, the data stream manager 140-1 modifies decoding information (e.g., timing information such as PCR, DTR, and PTS) associated with the content from the second content stream (e.g., channel 2) in accordance with decoding information associated with the content from the first content stream (e.g., channel 1).

In step 740, the data stream manager 140-1 transmits the modified decoding information in the outputted data stream to enable a recipient (e.g., subscriber 199-1) of the outputted data stream to seamlessly play back the outputted data stream based on same decoder state information that the subscriber 199-1 used to decode the content from the first content stream. Accordingly, because the timing information (e.g., information used for reception and playback purposes) associated with the second data stream is modified in accordance with that of the first content stream, the subscriber 199-1 need not re-synchronize itself with a new set of timing in the second data stream.

Figure 8:
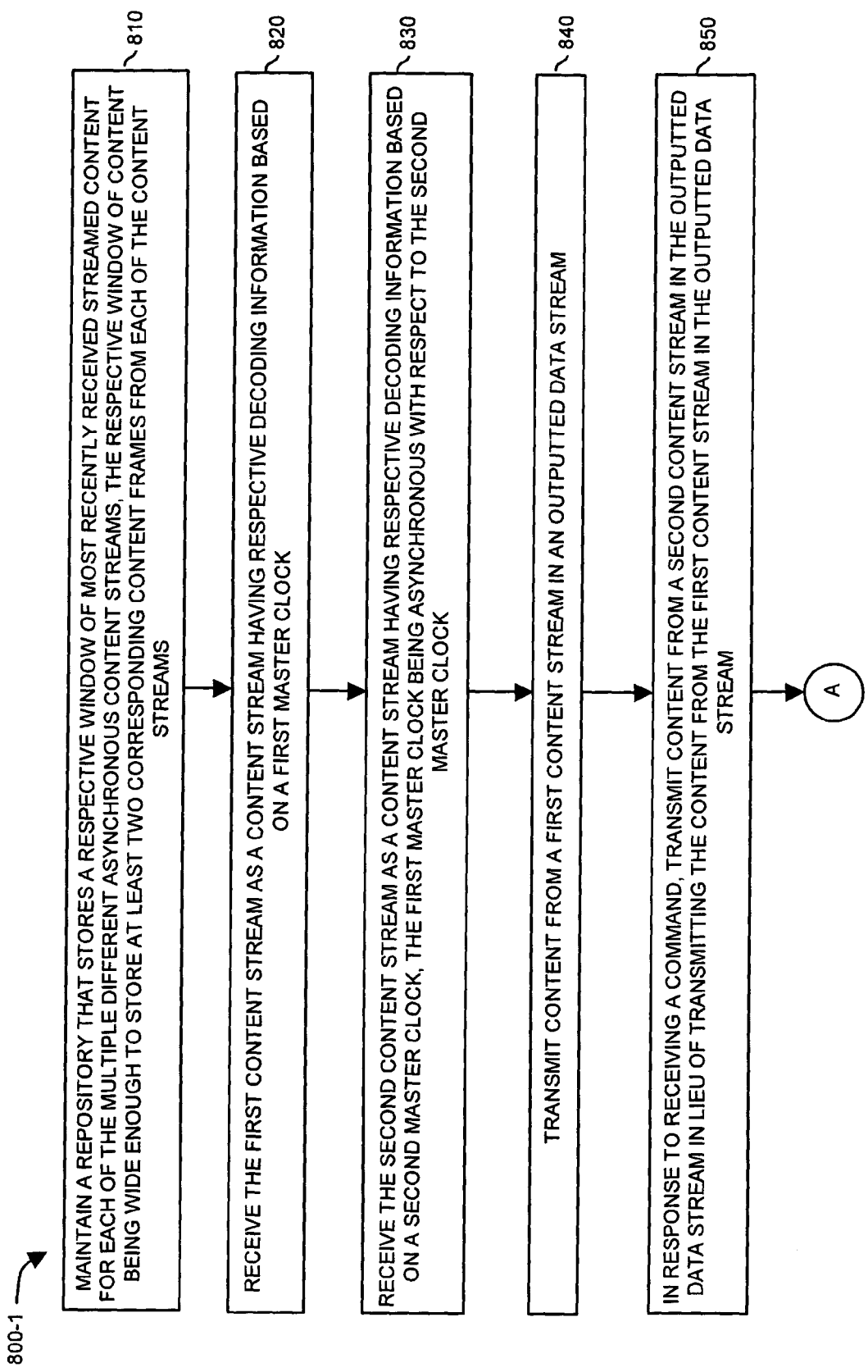
FIGS. 8 and 9 combine to form a flowchart illustrating more specific techniques of splicing content together according to an embodiment herein.
Figure 9:
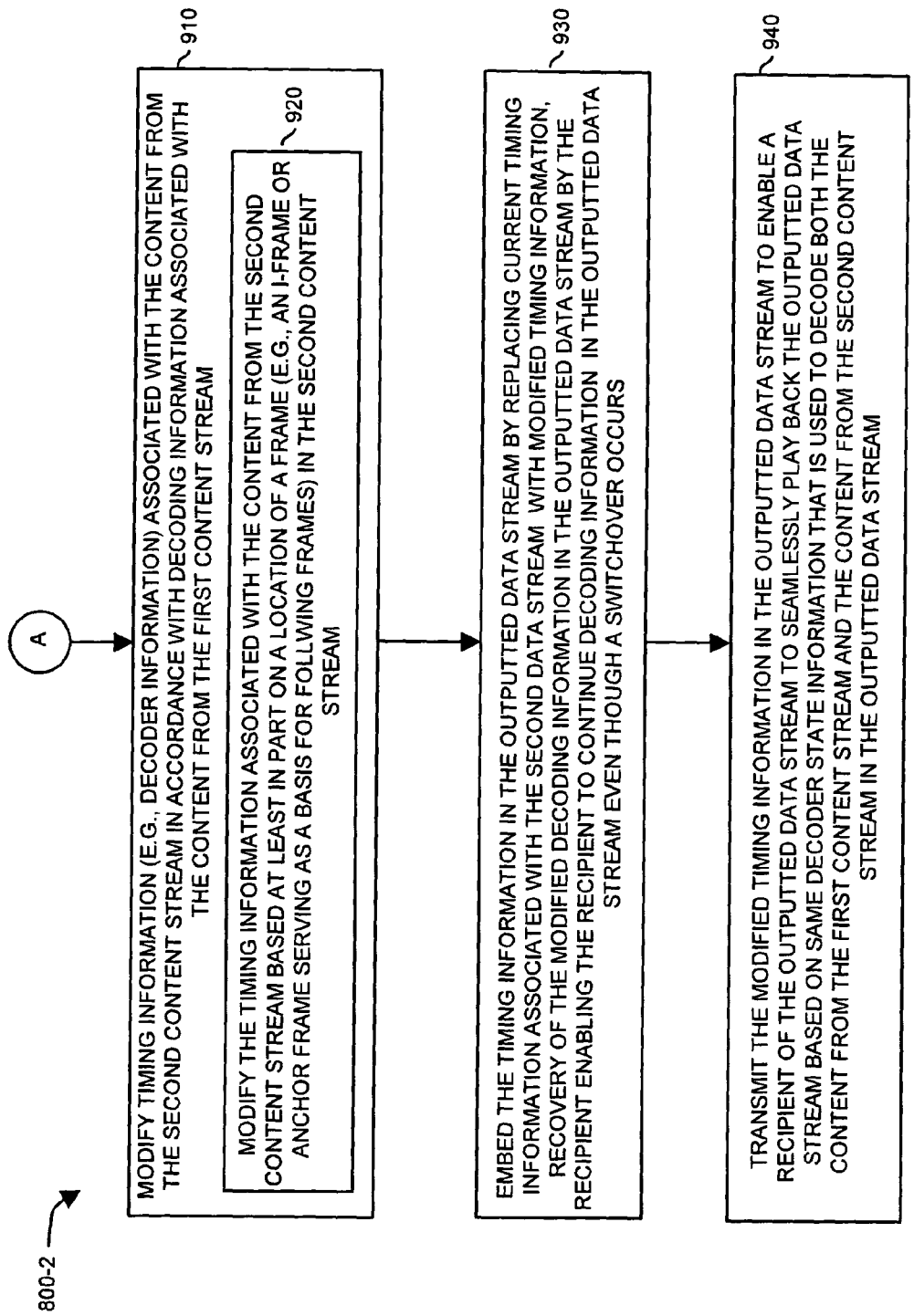

FIGS. 8 and 9 combine to form a flowchart 800 (e.g., flowchart 800-1 and flowchart 800-2) illustrating a technique of distributing data information according to an embodiment herein.

In step 810, the server 110 maintains a repository (e.g., buffers 120) to store a respective window of most recently received streamed content for each of the multiple different asynchronous content streams on channels 1-M. A respective window of content is wide enough to store at least one or two corresponding content frames (e.g., I-frames or anchor frames) from each of the content streams over network 119.

In step 820, the server 110 receives the first content stream (e.g., data on channel 1) as a content stream having respective decoding information based on a first master clock 117-1.

In step 830, the server 110 receives the second content stream (e.g., data on channel 2) as a content stream having respective decoding information based on a second master clock 117-2. As previously discussed, master clock 117-1 and master clock 117-2 are asynchronous or independently operated with respect to each other.

In step 840, the server 110 transmits content from a first content stream in an outputted data stream to subscriber 199-1.

In step 850, in response to receiving a command from subscriber 199-1, the server 110 initiates transmission of content from a second content stream (e.g., channel 2) in the outputted data stream in lieu of transmitting the content from the first content stream (e.g., channel 1) in the outputted data stream.

In step 910 of FIG. 9, the server 110 modifies timing information (e.g., decoder information) associated with the content from the second content stream (e.g., data information received on channel 2) in accordance with decoding information associated with the content from the first content stream (e.g., data information received on channel 1).

In sub-step 920 of step 910, the server 110 modifies the timing information associated with the content from the second content stream based at least in part on a location of a frame of information (e.g., an I-frame) in the second content stream.

In step 930, the server 110 embeds the newly modified timing information in the outputted data stream. In other words, the server 110 swaps original decoding information associated with the content from the second content stream with the modified decoding information. Recovery of the newly modified decoding information in the outputted data stream by the subscriber 199-1 enables the subscriber 199-1 to play back the data stream from the second channel without having to abandon its current decoding information and re-synchronize itself with the data from the second channel in the outputted data stream from server 110.

In step 940, the server 110 transmits the modified timing information in the outputted data stream (for the data associated with the second channel) to enable a recipient of the outputted data stream to seamlessly play back the outputted data stream based on same decoder state information that was previously used to decode the content from the first content stream.

As discussed, techniques herein are well suited for use in applications that perform operations such as reception, modification, and distribution of data streams. However, it should be noted that configurations herein are not limited to use in such applications and thus configurations herein and deviations thereof are well suited for other applications as well.

While this invention has been particularly shown and described with references to preferred embodiments thereof, it will be understood by those skilled in the art that various changes in form and details may be made therein without departing from the spirit and scope of the invention as defined by the appended claims. Such variations are intended to be covered by the scope of this invention. As such, the foregoing description of embodiments of the invention is not intended to be limiting. Rather, any limitations to embodiments of the invention are presented in the following claims.

What is claimed is:

1. A method comprising:
    receiving multiple, asynchonrous content streams, each content stream encoded according to unique timing information generated from separate, asynchronous master clocks at respective sources originating the content streams such that the first content stream and the second content stream originate from different sets of timing information, wherein the multiple, asynchronous content streams include:
        a first content stream received over a first channel as a first sequence of multiplexed transport packets, the first content stream having first decoding information based on first timing information generated from a first master clock;
        a second content stream received over a second channel as a second sequence of multiplexed transport packets, the second content stream having second decoding information based on second timing information generated from a second master clock, wherein the first master clock is asynchronous with respect to the second master clock;
    transmitting the first content stream in an outputted data stream;
    receiving a command from a recipient of the outputted data stream, the command including a request to switch the outputted data stream from the first channel to the second channel;
    modifying the second decoding information in the second sequence of multiplexed transport packets in the second content stream based on the first decoding information for decoding the first content stream such that decoding of the second content stream is based on the first decoding information for decoding the first content stream, wherein modifying the second decoding information based on the first decoding information synchronizes the second timing information with the first master clock; and
    splicing content together from the first and second asynchronous content streams into a single, contiguous data stream that can be decoded using a same decoding information at the recipient, wherein the second content stream is transmitted in the single, contiguous data stream in accordance with the modified second decoding information in the outputted data stream to enable seamless play back of the outputted data stream by the recipient.

2. A method as in claim 1 further comprising:
buffering the first content stream in a first buffer; and
buffering the second content stream in a second buffer.

3. A method as in claim 2, wherein the modifying of the second decoding information includes modifying the second timing information in the second buffer to synchronize the second timing information with the first master clock.

4. A method as in claim 1, wherein the modifying of the second decoding information prevents the recipient from having to abandon synchronization with respect to the content from the first content stream and resynchronize with the content from the second content stream.

5. A method as in claim 4, wherein the modifying of the second decoding information includes modifying timing information associated with the content from the second content stream, the modified timing information associated with the content from the second content stream used by the corresponding remote recipient to receive the content from the second content stream even though the first content stream and the second content stream are originated to have independent timing information with respect to each other.

6. A method as in claim 5, wherein the modifying of the timing information includes modifying the timing information associated with the content from the second content stream based at least in part on a location of a frame associated with the second content stream.

7. A method as in claim 1 further comprising:
swapping the second decoding information associated with the content from the second content stream with the modified second decoding information to enable the recipient to seamlessly decode and play back the content from the second content stream after decoding and playing back the content from the first content stream.

8. A method as in claim 1 further comprising:
updating the modified second decoding information in the outputted data stream at multiple locations of the outputted data stream, recovery of the modified second decoding information in the outputted data stream enabling the recipient to playback the content from the second content stream.

9. A method as in claim 1 further comprising:
maintaining a repository that stores a respective window of most recently received streamed content for each of the first content stream and the second content stream, the respective window of content being wide enough to store at least two corresponding anchor frames from each of the first content stream and the second content stream.

10. A method as in claim 9 further comprising:
utilizing a time offset between a content frame in the first content stream and a content frame in the second content stream to adjust the decoding information associated with the outputted data stream for purposes of enabling seamless playback of the outputted data stream without the recipient having to resynchronize itself with the second decoding information associated with the content from the second content stream.

11. A method as in claim 1, wherein receiving the command occurs in response to a respective user at the recipient initiating a channel change on a respective media player to view the content associated with the second content stream in lieu of viewing the content from the first content stream.

12. A method as in claim 1 further comprising:
receiving data on the first channel and the second channel over a network; and
utilizing an MPEG (Moving Pictures Expert Group) type of protocol to convert the received data to multiple asynchronous content streams including the first content stream and the second content stream.

13. A method as in claim 11, wherein the modifying of the second decoding information enables the recipient to seamlessly decode the outputted data stream including the content associated with the first content stream and the content associated with the second content stream without reacquiring synchronization even though the first content stream and the second content stream are received as asynchronous content streams with respect to each other.

14. A method as in claim 1, wherein the modifying of the second decoding information includes modifying timing information associated with the data stream, the timing information enabling the corresponding recipient to lock onto and play back the outputted data stream, which is an MPEG (Moving Pictures Expert Group) encoded data stream.

15. A method as in claim 14, wherein modifying the timing information includes modifying the timing information associated with the data stream based at least in part on a time offset representing a time delay between an I-frame in the first content stream and an I-frame in the second content stream.

16. A method as in claim 15, wherein receiving the command occurs in response to a respective user at the corresponding remote recipient initiating a channel change on a respective media player to view the content associated with the second content stream in lieu of the content from the first content stream.

17. A method as in claim 16 further comprising:
maintaining a repository that stores a respective window of most recently received streamed content for each of the multiple asynchronous content streams, the respective window of content being wide enough to store at least two corresponding I-frames from each of the multiple asynchronous content streams.

18. An apparatus comprising:
buffers to at least temporarily store a respective window of most recently received streamed content for each of multiple asynchronous content streams on multiple channels, each content stream encoded according to unique timing information generated from separate, asynchronous master clocks at respective sources originating the content streams such that the first content stream and the second content stream originate from different sets of timing information, wherein the multiple, asynchronous content streams include:
a first content stream associated with a first channel as a first sequence of multiplexed transport packets, and having first decoding information based on first timing information generated from a first master clock, and
a second content stream associated with a second channel as a second sequence of multiplexed transport packets, and having second decoding information based on second timing information generated from a second master clock, the first master clock being asynchronous with respect to the second master clock;
a data stream manager that transmits content from the first content stream in an outputted data stream and, in response to receiving a command, thereafter transmits content from the second content stream in the outputted data stream in lieu of transmitting the content from the first content stream in the outputted data stream; and
the data stream manager:
modifying the second timing information in the second sequence of multiplexed transport packets in the second content stream based on the first decoding information for decoding the first content stream such that decoding of the second content stream is based on the first decoding information for decoding the first content stream, wherein modifying the second decoding information based on the first decoding information synchronizes the second timing information with the first master clock, and splicing content together from the first and second asynchronous content streams into a single, contiguous data stream that can be decoded using a same decoding information at the recipient to enable a recipient of the outputted data stream to seamlessly play back the outputted data stream based on same decoder state information that is used to decode both the content from the first content stream and the content from the second content stream in the outputted data stream.

19. An apparatus as in claim 18, wherein each of the buffers stores a respective window of content including at least two corresponding content frames associated with a corresponding stored content stream.

20. An apparatus as in claim 18 further comprising:
a repository to store switchover information indicating timing correction information indicating how to modify the timing information associated with the content from the second content stream.

21. An apparatus as in claim 20, wherein the switchover information further identifies a readpoint from which to retrieve data from a respective buffer storing the second content stream.

22. An apparatus as in claim 21, wherein the readpoint indicates a location of an I-frame in the respective buffer.

23. A computer system comprising:
a processor;
a memory unit that stores instructions associated with an application executed by the processor; and
an interconnect coupling the processor and the memory unit, enabling the computer system to execute the application and perform operations of:
receiving multiple, asynchonrous content streams, each content stream encoded according to unique timing information generated from separate, asynchronous master clocks at respective sources originating the content streams such that the first content stream and the second content stream originate from different sets of timing information, wherein the multiple, asynchonrous content streams include:
a first content stream received over a first channel as a first sequence of multiplexed transport packets, the first content stream having first decoding information based on first timing information generated from a first master clock;
a second content stream received over a second channel as a second sequence of multiplexed transport packets, the second content stream having second decoding information based on second timing information generated from a second master clock, wherein the first master clock is asynchronous with respect to the second master clock;
transmitting the first content stream in an outputted data stream;
receiving a command from a recipient of the outputted data stream, the command including a request to switch the outputted data stream from the first channel to the second channel;
modifying the second decoding information in the second sequence of multiplexed transport packets in the second content stream based on the first decoding information for decoding the first content stream such that decoding of the second content stream is based on the first decoding information for decoding the first content stream, wherein modifying the second decoding information based on the first decoding information synchronizes the second timing information with the first master clock; and
splicing content together from the first and second asynchronous content streams into a single, contiguous data stream that can be decoded using a same decoding information at the recipient, wherein the second content stream is transmitted in the single, contiguous data stream in accordance with the modified second decoding information in the outputted data stream to enable seamless play back of the outputted data stream by the recipient.

24. A computer system as in claim 23 further supporting operations of:
buffering the first content stream in a first buffer; and
buffering the second content stream in a second buffer.

25. A computer system as in claim 24, wherein the modifying of the second decoding information includes modifying the second timing information in the second buffer to synchronize the second timing information with the first master clock.

26. A computer system as in claim 23, wherein the modifying of the second decoding information prevents the recipient from having to abandon synchronization with respect to the content from the first content stream and resynchronize with the content from the second content stream.

27. A computer system as in claim 23, wherein the modifying of the second decoding information includes modifying the timing information associated with the content from the second content stream based at least in part on time correction information representing at least in part a time difference between respective master clocks generating the first content stream and the second content stream.

28. A computer system as in claim 23 further supporting operations of:
swapping the second decoding information associated with the content from the second content stream with the modified second decoding information to enable the recipient to seamlessly decode and play back the content from the second content stream after decoding and playing back the content from the first content stream.

29. A computer system as in claim 23 further supporting operations of:
maintaining a repository of buffers that store a respective window of most recently received streamed content for each of the first content stream and the second content stream, the respective window of content being wide enough to store at least two corresponding anchor frames from each of the first content stream and the second content stream.

30. A computer system as in claim 23, wherein receiving the command occurs in response to a respective user at the recipient initiating a channel change on a respective media player to view the content associated with the second content stream in lieu of viewing the content from the first content stream.

* * * * *

UNITED STATES PATENT AND TRADEMARK OFFICE
CERTIFICATE OF CORRECTION

| | | |
|---|---|---|
| PATENT NO. | : 9,286,214 B2 | |
| APPLICATION NO. | : 11/605514 | |
| DATED | : March 15, 2016 | |
| INVENTOR(S) | : Francis J. Stifter, Jr. | |

It is certified that error appears in the above-identified patent and that said Letters Patent is hereby corrected as shown below:

Claims

Column 14, line 23, Claim 1, and Column 17, line 39, Claim 23, the error occurs with the misspelling as: "asynchonrous", whereas the Correct spelling should be: "asynchronous".

Signed and Sealed this
Fifth Day of July, 2016

Michelle K. Lee
*Director of the United States Patent and Trademark Office*